(12) United States Patent
Bird

(10) Patent No.: US 9,645,038 B2
(45) Date of Patent: May 9, 2017

(54) APPARATUS AND METHOD FOR MEASURING GAS FLOW THROUGH A ROTARY SEAL

(71) Applicant: ROLLS-ROYCE PLC, London (GB)

(72) Inventor: Colin Bird, Derby (GB)

(73) Assignee: ROLLS-ROYCE plc, London (GB)

( * ) Notice: Subject to any disclaimer, the term of this patent is extended or adjusted under 35 U.S.C. 154(b) by 698 days.

(21) Appl. No.: 14/072,252

(22) Filed: Nov. 5, 2013

(65) Prior Publication Data

US 2014/0133963 A1 May 15, 2014

(30) Foreign Application Priority Data

Nov. 12, 2012 (GB) .................................. 1220268.5

(51) Int. Cl.
| | |
|---|---|
| *F01D 11/00* | (2006.01) |
| *F01D 11/02* | (2006.01) |
| *F01D 17/08* | (2006.01) |
| *F02C 7/28* | (2006.01) |
| *G01M 3/26* | (2006.01) |

(52) U.S. Cl.
CPC ............... *G01M 3/26* (2013.01); *F01D 11/00* (2013.01); *F01D 11/02* (2013.01); *F01D 11/025* (2013.01); *F01D 17/08* (2013.01); *F01D 17/085* (2013.01); *F02C 7/28* (2013.01)

(58) Field of Classification Search
CPC ...... F01D 11/00; F01D 11/001; F01D 11/005; F01D 11/006; F01D 11/02; F01D 11/025; F01D 11/08; F01D 11/14; F01D 11/20; F01D 11/22; F01D 11/24; F01D 17/00; F01D 17/02; F01D 17/08; F01D 21/003; F01D 17/085; F02C 7/28; G01M 3/26; G01M 3/28; G01M 3/2807; G01M 3/2815; G01M 3/2853; G01M 3/2869
USPC ............... 73/112.01, 112.03, 118.01–118.03, 73/861.07
See application file for complete search history.

(56) References Cited

U.S. PATENT DOCUMENTS

| | | | |
|---|---|---|---|
| 4,447,190 A | 5/1984 | Campbell | |
| 4,497,172 A | 2/1985 | Smith | |
| 4,715,213 A * | 12/1987 | McGreehan | G01M 3/20 277/320 |
| 6,132,168 A * | 10/2000 | Kovaleski | F01D 11/001 415/107 |
| 6,701,722 B1 * | 3/2004 | Seo | F25B 13/00 62/129 |
| 2011/0303019 A1 * | 12/2011 | Gysling | G01F 1/704 73/861.07 |

(Continued)

FOREIGN PATENT DOCUMENTS

| | | |
|---|---|---|
| EP | 1 022 436 A2 | 7/2000 |
| JP | 59155717 A  * | 9/1984 |

OTHER PUBLICATIONS

Mar. 12, 2013 British Search Report issued in British Application No. 1220268.5.

*Primary Examiner* — Gregory Anderson
*Assistant Examiner* — Christopher R Legendre
(74) *Attorney, Agent, or Firm* — Oliff PLC

(57) ABSTRACT

A method of measuring a flow rate of a first fluid through a rotary seal of a gas turbine engine comprising controlling a probe flow of a second fluid at an intra-seal cavity and measuring a pressure change in the first fluid caused by the probe flow.

16 Claims, 3 Drawing Sheets

(56) References Cited

U.S. PATENT DOCUMENTS

2014/0133963 A1* 5/2014 Bird .................. F01D 11/025
 415/118

* cited by examiner

APPARATUS AND METHOD FOR MEASURING GAS FLOW THROUGH A ROTARY SEAL

This invention claims the benefit of UK Patent Application No. 1220268.5, filed on 12 Nov. 2012, which is hereby incorporated herein in its entirety.

FIELD OF THE INVENTION

Embodiments of the present invention relate to an apparatus and method for measuring fluid flow through a rotary seal. In particular, they relate to an apparatus and method for measuring fluid flow through a rotary seal in gas turbine engines.

BACKGROUND TO THE INVENTION

Rotary seals are placed between two parts, one or both of which may rotate. Rotary seals may be used to seal the air system of a gas turbine engine.

Measurement of seal leakage flow in rotary seals is particularly difficult due to the multitude of inlet and outlet flow paths on each side of the seal.

Measurement of mechanical clearance of seal parts may be used to obtain information relating to the seal leakage flow, however such measurements have the disadvantage of requiring bulky probes to be introduced into the gas turbine engine. The rotary seal parts are unsuitable for mounting such probes and so the probes need to be mounted on nearby components which support the seal, introducing uncertainty into the clearance measurement due to the mechanical behavior of the components.

BRIEF DESCRIPTION OF VARIOUS EMBODIMENTS OF THE INVENTION

According to a first aspect of the invention there is provided a method of measuring a flow rate of a first fluid flow, the first fluid flow flowing through a rotary seal of a gas turbine engine comprising: applying a probe flow of a second fluid to an intra-seal cavity; controlling the probe flow at the intra-seal cavity; and measuring a pressure change in the first fluid flow through the rotary seal caused by the probe flow of the second fluid.

This provides an advantage that a direct measurement of pressure change within a cavity can be made, which relates to the seal leakage flow.

According to a second aspect of the invention there is provided a gas turbine engine comprising: a first cavity and a second cavity, whereby during operation of the gas turbine engine the first cavity receives a flow of a first fluid at a first pressure and the second cavity receives the first fluid flow at a second pressure, the first pressure being higher than the second pressure; a rotary seal separating the first cavity from the second cavity, comprising a first member, a second member radially proximal to the first member, that rotates relative to the first member during operation of the gas turbine engine and at least one intra-seal cavity formed between the first member and the second member; a probe flow control system configured to control a probe flow of a second fluid at the at least one intra-seal cavity; and a sensor configured to measure a pressure change in the first fluid flow as it flows through the rotary seal caused by the probe flow of the second fluid.

According to a third aspect of the invention there is provided a first member of a rotary seal for a gas turbine engine comprising: a sealing surface configured to form a seal with a second member of the rotary seal that rotates relative to the first member during operation of the gas turbine engine, the second member being radially proximal to the first member, wherein the seal comprises at least one intra-seal cavity formed between the sealing surface and the second member; and multiple apertures in the sealing surface configured to provide a probe flow of a second fluid and to measure a pressure change in a flow of a first fluid as it flows through the rotary seal at the at least one intra-seal cavity caused by the probe flow of the second fluid.

BRIEF DESCRIPTION OF THE DRAWINGS

For a better understanding of various examples of embodiments of the present invention reference will now be made by way of example only to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF VARIOUS EMBODIMENTS OF THE INVENTION

The figures illustrate a method of measuring a flow rate of a first fluid through a rotary seal 20 of a gas turbine engine 110 comprising, controlling a probe flow of a second fluid 34 at an intra-seal cavity 22, and measuring a pressure change in the first fluid caused by the probe flow of the second fluid 34.

Figure 1:
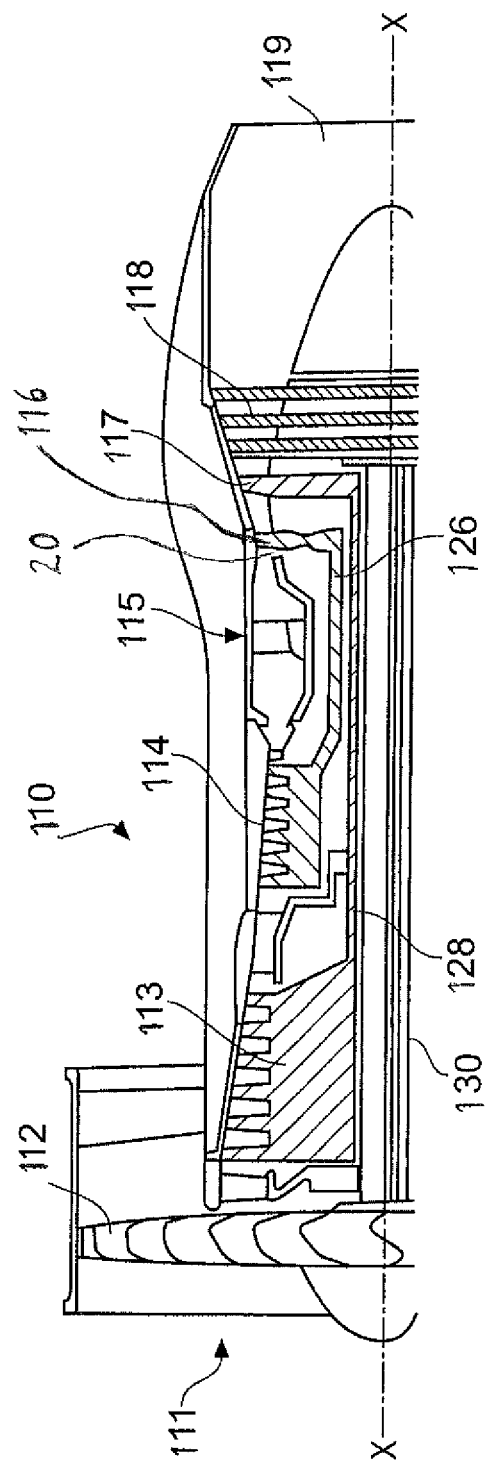
FIG. 1 is a cross-sectional view of an example of a gas turbine engine.

Referring to FIG. 1, a gas turbine engine is generally indicated at 110 and comprises, in axial flow series, an air intake 111, a propulsive fan 112, an intermediate pressure compressor 113, a high pressure compressor 114, a combustor 115, a turbine arrangement comprising a high pressure turbine 116, an intermediate pressure turbine 117 and a low pressure turbine 118, and an exhaust nozzle 119.

The gas turbine engine 110 operates in a conventional manner so that air entering the intake 111 is accelerated by the fan 112 which produces two air flows: a first air flow into the intermediate pressure compressor 113 and a second air flow which provides propulsive thrust. The intermediate pressure compressor compresses the air flow directed into it before delivering that air to the high pressure compressor 114 where further compression takes place.

The compressed air exhausted from the high pressure compressor 114 is directed into the combustor 115 where it is mixed with fuel and the mixture combusted. The resultant hot combustion products then expand through, and thereby drive, the high, intermediate and low pressure turbines 116, 117 and 118 before being exhausted through the nozzle 119 to provide additional propulsive thrust. The high, intermediate and low pressure turbines 116, 117 and 118 respectively drive the high and intermediate pressure compressors 114 and 113 and the fan 112 by suitable interconnecting shafts 126, 128, 130.

Rotary seals 20 may be used to separate one section of the gas turbine engine 110 from another section.

Figure 2:
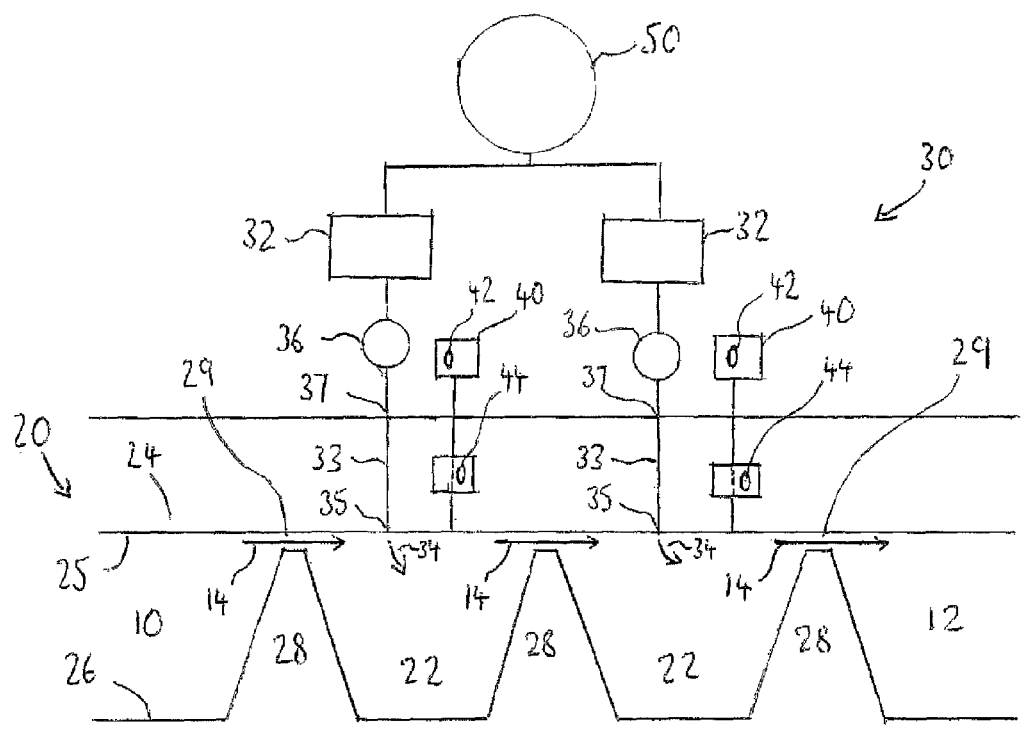
FIG. 2 is a schematic view of a rotary seal arrangement and system for measuring fluid leakage flow at the rotary seal according to a first embodiment of the invention.

FIG. 2 illustrates a rotary seal 20 and a system 30 for measuring fluid leakage flow at the rotary seal 20, according to a first embodiment of the invention. The system 30 comprises a first cavity 10 and a second cavity 12. During operation of the gas turbine engine, the first cavity 10 receives a first fluid at a first pressure and the second cavity receives the first fluid at a second pressure, the first pressure being higher than the second pressure. A rotary seal 20 separates the first cavity 10 from the second cavity 12.

In operation, the first fluid in the first cavity 10 will tend to flow towards the second cavity 12. A fluid leakage flow 14 traverses through the rotary seal 20 from the higher pressure first cavity 10 to the lower pressure second cavity 12 during operation of the gas turbine engine 110.

The rotary seal 20 comprises a radially outer, first member 24, a radially inner, second member 26 that rotates relative to the first member 24 during operation of the gas turbine engine 110 and a series of intra-seal cavities 22 formed between a sealing surface 25 of the first member 24 and protrusions 28, or fins, in the second member 26. The protrusions 28 in FIG. 2 are shown with a truncated triangular cross-section. However, protrusions 28 with other cross-sectional geometries may be used, such as those with square, rectangular or triangular cross-sections. Protrusions 28 with complex cross-sectional shapes could be used.

The rotary seal 20 may form a labyrinth seal where the fluid leakage flow 14 between the higher pressure, first cavity 10 and the lower pressure, second cavity 12 is forced to traverse through a series of clearance gaps 29 formed between the series of protrusions 28 or fins and the closely located sealing surface 25. Each protrusion 28 may form a knife-edge seal with the sealing surface 25. As the fluid leakage flow 14 expands as it passes through each clearance gap 29, between each protrusion 28 and the sealing surface 25, the flow is disturbed causing a reduction in fluid leakage flow 14.

Although FIG. 2 illustrates a rotary seal 20 with two intra-seal cavities 22, formed by three protrusions 28 on the inner, second member 26, it will be appreciated that the rotary seal 20 may comprise any number of intra-seal cavities 22 formed between one or more sealing surfaces 25 of the outer, first member 24 and a plurality of protrusions 28 on the inner, second member 26.

In the example of FIG. 2, the outer, first member 24 of the rotary seal 20 is stationary and the inner, second member 26 of the rotary seal 20 is rotatable about an axis. The protrusions 28 on the inner, second member 26 extend from the body of the inner, second member 26 in a radial direction, such that the sealing surface 25 of the outer, first member 24 and the protrusions 28 of the inner, second member 26 are separated by a clearance gap 29. The clearance gap 29 between the tip of a protrusion 28 and the corresponding sealing surface 25 of the outer, first member 24 may be in the order of 0.5 mm. Alternatively the clearance gap 29 between the tip of a protrusion 28 and the corresponding sealing surface 25 of the outer, first member 24 may be smaller or larger than a 0.5 mm separation. Each of the protrusions 28 may be positioned at a different location along the length of the axis. Each protrusion 28 extends circumferentially, forming a ring, separated from the sealing surface 25 of the outer, first member 24 by a clearance gap 29. The clearance gap 29 between the tip of each protrusion 28 and a corresponding sealing surface 25 of the outer, first member 24 may be different or may be the same as the clearance gap 29 for one or more of the other protrusions 28. The separation between adjacent protrusions 28 along the axis defines an annular intra-seal cavity 22.

The system 30 further comprises a probe flow control system 32. In the example of FIG. 2 the probe flow control system 32 is configured to control a probe flow of a second fluid 34 at each of the intra-seal cavities 22.

In various example embodiments, the probe flow control system 32 may be configured to control a probe flow of the second fluid 34 at one or more intra-seal cavities 22 and at one or more locations within an intra-seal cavity 22.

The probe flow 34 is a flow of the second fluid at the intra seal cavity 22 additional to the normal fluid leakage flow 14 traversing through the rotary seal 20 from the higher pressure, first cavity 10 to the lower pressure, second cavity 12 during operation of the gas turbine engine 110.

The probe flow of the second fluid 34 may be a flow into or away from the intra-seal cavity 22. In the embodiment illustrated in FIG. 2, the probe flow of gas 34 is a flow into the intra-seal cavity 22.

The probe flow control system 32 is configured to control a probe flow of the second fluid 34 at any one of a plurality of intra-seal cavities 22 at a time.

The probe flow control system 32 may comprise a valve, which may be a remotely controllable valve such as an electric solenoid valve, and a flow measurement device, such as a differential pressure measurement device, an example of which is an orifice plate, in order to control and measure the probe flow of the second fluid 34.

The system 30 further comprises a measurement system 40. In the example of FIG. 2 the measurement system 40 is configured to measure fluid pressure at each of the intra-seal cavities 22.

In various embodiments the measurement system 40 may be configured to measure fluid pressure at the one or more intra-seal cavities 22 and at one or more locations within an intra-seal cavity 22.

The measurement system 40 uses pressure sensors 42 configured to measure a fluid pressure change in the first fluid caused by the probe flow of the second fluid 34. In the example of FIG. 2, one pressure sensor 42 is used in each intra-seal cavity 22 to measure pressure within that intra-seal cavity 22. The pressure sensor 42 may be located in, or remote from (but interconnected to), the intra-seal cavity 22.

Additionally, a temperature sensor 44 may be present and configured to measure a temperature change within the intra-seal cavity 22. The temperature change may be responsive to the probe flow of the second fluid 34.

In order to facilitate the transfer of a probe flow of gas 34 at the intra-seal cavity 22, the intra-seal cavity 22 communicates with a pressure source 50, which may be a source of atmospheric pressure, high pressure or negative pressure.

In the example of FIG. 2, a conduit such as a pipe 33 is located through the outer, first member 24 defining, at one end, an aperture 35 in a sealing surface 25 of the outer, first member 24 and defining, at the other end, an interface 37 for transfer of the probe flow of the second fluid 34 from a regulated store of compressed gas 50 via the probe flow control system 32 and a meter 36 configured to measure the flow rate of the probe flow 34. Typically the internal diameter of pipe 33 will be in the region of 5 mm or less in order to apply a sufficient flow rate of the second fluid 34 to compete with the gas leakage flow 14 and therefore influence the pressure in the intra-seal cavity 22 sufficiently to be measured by a pressure sensor 42. However different internal pipe 33 diameters may be used depending on the magnitude of the gas leakage flow 14. A smaller fluid leakage flow 14 may allow a smaller internal diameter pipe 33 to be used and a larger fluid leakage flow 14 may require a larger internal diameter pipe 33.

Figure 3:
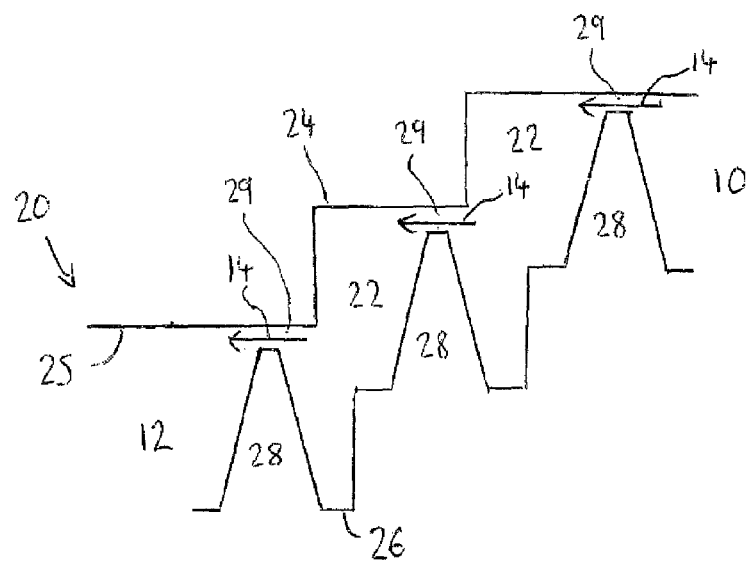
FIG. 3 is a cross-sectional view of the first and second members of a rotary seal arrangement according to a second embodiment of the invention.

FIG. 3 shows a rotary seal 20 according to a second embodiment of the invention. The rotary seal 20 of FIG. 3 comprises an outer, first member 24, an inner, second member 26 that rotates relative to the outer, first member 24 during operation of the gas turbine engine 110 and a series of intra-seal cavities 22 formed between a stepped sealing surface 25 of the outer, first member 24 and a stepped arrangement of protrusions 28 on the inner, second member 26. The stepped sealing surface 25 of the outer, first member 24 and a stepped arrangement of protrusions 28 on the inner, second member 26 forms a stepped seal arrangement. In contrast, the arrangement of the sealing surface 25 of the outer, first member 24 and the arrangement of protrusions 28 on the inner, second member 26 shown in FIG. 2 illustrates a linear seal arrangement.

The embodiment of FIG. 3 illustrates two intra-seal cavities 22, formed by three protrusions 28 from the inner, second member 26. It will be appreciated that the rotary seal 20 may comprise any number of intra-seal cavities 22 formed between a sealing surface 25 of the outer, first member 24 and a plurality of protrusions 28 in the inner, second member 26.

The stepped arrangement of the sealing surfaces 25, the protrusions 28 and the intra-seal cavities 22, provides a more tortuous path for the fluid leakage flow 14, which may reduce overall fluid leakage in the system 30, by introducing additional vortices into the fluid leakage flow 14.

Figure 4:
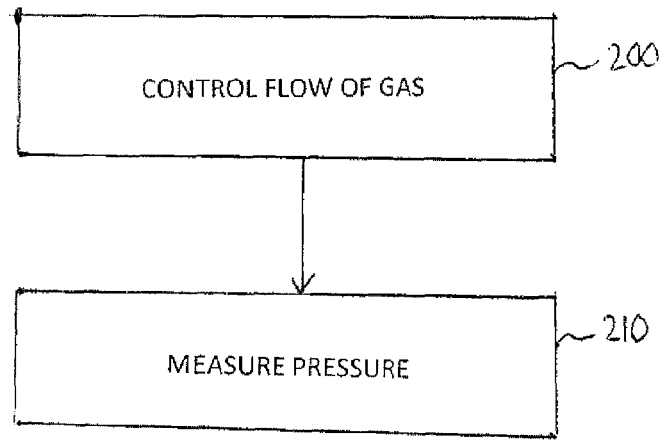
FIG. 4 is a flow chart of a method of measuring fluid leakage flow through a rotary seal according to the invention.

The flow chart of FIG. 4 illustrates a method for measuring fluid flow through a rotary seal 20, according to the invention, and in particular a method for measuring fluid flow through a rotary seal 20 of a gas turbine engine 110, according to the invention.

The method of measuring fluid flow through a rotary seal 20 of a gas turbine engine 110 comprises, in block 200, the step of controlling a probe flow of the second fluid 34 at an intra-seal cavity 22 and, in block 210, the step of measuring a pressure change in the first fluid caused by the probe flow of the second fluid 34.

For a given amount of the second fluid introduced into or extracted from an intra-seal cavity 22, the change in fluid pressure measured will depend on the fluid leakage flow 14 at the intra-seal cavity 22. The variation of intra-seal cavity 22 pressure change with a known applied probe flow of the second fluid 34 may be calibrated using computational fluid dynamics, through experimental simulation or by another calibration method. Alternatively the system 30 could be configured to perform measurements over a period of time, with an initial measurement or series of measurements providing a baseline value of the fluid pressure change responsive to the probe flow of the second fluid 34 to which subsequent measurements are compared. Such a system would not necessarily require calibration. The deviation in the measurement from the baseline could be used to flag up a requirement for maintenance or an emergency shutdown for example.

The probe flow of the second fluid 34 may be measured using a meter 36, such that a known flow rate of the second fluid 34 may be applied at the intra-seal cavity 22. The flow rate of the second fluid 34 may be controlled in part by a valve, which may be a remotely controlled valve such as an electric solenoid valve, and the flow rate of the second fluid 34 may be measured using a flow measurement device such as an orifice plate.

A probe flow of the second fluid 34 may be controlled at any one of a plurality of intra-seal cavities 22.

The probe flow of the second fluid 34 may be modulated in time such that it is alternately turned on or off, for example by applying a high pressure probe flow of the second fluid 34 followed by cessation of the application of the probe flow 34. Alternatively, the probe flow of gas 34 may be modulated in time by applying a negative pressure probe flow 34 followed by cessation of the application of the probe flow 34. Alternatively, the probe flow of the second fluid 34 may be modulated in time by applying a probe flow 34 at atmospheric pressure followed by cessation of the application of the probe flow 34.

Alternatively the probe flow of the second fluid 34 may be modulated between two or more different pressure levels of an applied probe flow 34. These pressures could be different high pressures or different negative pressures, or a combination of high, negative and atmospheric pressures.

The probe flow of the second fluid 34 may be additionally or alternatively modulated in space. Different probe flows of the second fluid 34 may be applied to different circumferential points around the rotary seal 20. In one example embodiment the probe flow of the second fluid 34 may be modulated such that different probe flows 34 may be applied to different circumferential points around an intra-seal cavity 22 of the rotary seal 20 at different times. The different probe flows 34 may comprise the same pressures applied at the different locations around the rotary seal 20 in order to obtain spatial information relating to the operation of the rotary seal 20.

Alternatively, or in addition to the circumferential spatial modulation, different probe flows of the second fluid 34 may be applied to different axial locations along the rotary seal 20. In one example embodiment the probe flow of the second fluid 34 may be modulated such that different probe flows 34 may be applied to different intra-seal cavities 22 of the rotary seal 20 at different times. The different probe flows 34 may comprise the same pressures applied at the different locations along the rotary seal 20 in order to obtain spatial information relating to the operation of the rotary seal 20.

The probe flow of the second fluid 34 may be intermittently provided such that measurements can be taken during the application of the probe flow 34 and after applying the probe flow 34. A comparison of the pressure measurement at the intra-seal cavity 22 with and without the influence of the probe flow 34 can then be used to determine seal efficiency.

Alternatively measurements can be taken during pressurization and/or depressurization of the intra-seal cavity 22 by observing the rate of change of pressure during application of or following cessation of the application of a probe flow of the second fluid 34. The rate of change of pressure may be calibrated with seal clearance using computational fluid dynamics, experimental simulation or by another calibration method. Alternatively the system 30 could be configured to perform measurements over a period of time, with an initial measurement or series of measurements providing a baseline value of the gas pressure change responsive to the probe flow 34 to which subsequent measurements are compared. Such a system 30 would not necessarily require calibration. The deviation in the measurement from the baseline could be used to flag up a requirement for maintenance or an emergency shutdown for example.

The probe flow of the second fluid 34 may be provided at a controllable flow rate dictated by the operation of the probe flow control system 32. A meter 36 may be used to measure the flow rate of the probe flow 34 applied at the intra-seal cavity 22.

The gas pressure change responsive to the probe flow of the second fluid 34 may be measured at one or at multiple locations within the rotary seal 20. In FIG. 2 measurement of the gas pressure change responsive to the probe flow 34 is measured in each intra-seal cavity 22, by a separate pressure sensor 42.

The gas pressure change responsive to the probe flow of the second fluid 34 may be measured at one or at multiple locations within the intra-seal cavity 22. In FIG. 2 only one measurement location is shown in each intra-seal cavity 22, however it is to be understood that multiple measurement locations may be provided around the circumference of one or more intra-seal cavity 22.

Alternatively, or in addition, a gas pressure change responsive to the probe flow of the second fluid 34 may be measured at one or more locations in a further intra-seal cavity 22 different to the intra-seal cavity 22 that the probe flow 34 is applied to. For example, the measurement may be made in an adjacent intra-seal cavity 22, or may be made in any of the intra seal cavities 22 of the rotary seal 20.

Alternatively, or in addition, a temperature change responsive to the probe flow of the second fluid 34 may be measured. Such a temperature change may be due to thermodynamic effects of increasing or decreasing pressure in the intra-seal cavity 22 and/or may be due to the temperature of the probe flow 34 being at a different value to the fluid of the fluid leakage flow 14.

A controller may be provided to control the operation of the system 30. The controller may comprise a program which is executed on a processor. The program may be stored in a memory. Such a controller may be comprised in a computer.

The controller may control the flow rate of the probe flow of the second fluid 34 together with the operation of the probe flow control system 32. The controller may additionally or alternatively control the operation of the measurement system 40. The controller may receive measurement values from one or more pressure sensors 42 and/or one or more temperature sensors 44. The controller may perform analysis on the measurement values. The analysis of the measurement values may provide information relating to the seal leakage flow 14, and therefore provide information relating to the efficiency of the rotary seal 20.

The method provided in FIG. 4 may be carried out during testing of a gas turbine engine 110. Alternatively or in addition it may be carried out during in-service operation of the gas turbine engine 110.

Figure 5:
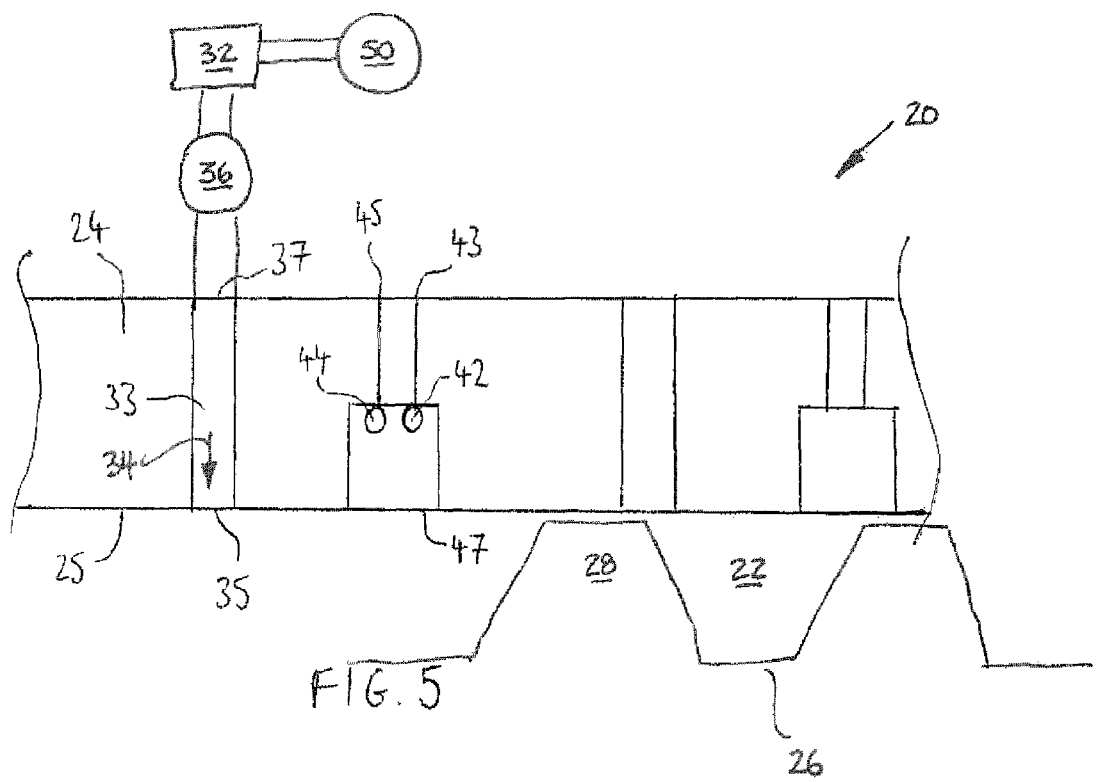
FIG. 5 is a schematic cross-sectional view of an outer member of a rotary seal arrangement according to a third embodiment of the invention.

FIG. 5 shows an outer, first member 24 of a rotary seal 20 of a gas turbine engine 110 according to a third embodiment of the invention.

In the embodiment shown in FIG. 5, the outer, first member 24 of the rotary seal 20 of a gas turbine engine 110 comprises a sealing surface 25 configured to form a seal with an inner, second member 26 of the rotary seal 20, and in particular form a seal with protrusions 28 on the inner, second member 26 of the rotary seal 20, that rotates relative to the outer, first member 24 during operation of the gas turbine engine 110. The rotary seal 20 comprises at least one intra-seal cavity 22 formed between the sealing surface 25 and the inner, second member 26, and in particular formed between the sealing surface 25 and the protrusions 28 on the inner, second member 26, of the rotary seal 20. The outer, first member 24 of the rotary seal 20 comprises multiple apertures 35, 47 in the sealing surface 25 configured to provide a probe flow of the second fluid 34 and to measure fluid pressure at an intra-seal cavity 22.

In the embodiment of FIG. 5, a conduit such as a pipe 33 is located through the outer, first member 24 defining, at one end, an aperture 35 in a sealing surface 25 of the outer, first member 24 and defining, at the other end, an interface 37 for transfer of the probe flow of the second fluid 34 from a source of atmospheric pressure, high pressure or negative pressure, such as a regulated store of compressed gas 50, via a probe flow control system 32 and a meter 36 configured to measure the probe flow 34.

A pressure sensor 42 may be configured to measure fluid pressure in the intra-seal cavity 22. The pressure sensor 42 may be located within an aperture 47 in the body of the outer, first member 24, as illustrated in FIG. 5, or may be located external to the outer, first member 24. A pipe or conduit interconnects the intra-seal cavity 22 to the pressure sensor 42 via an aperture 47. The internal diameter of the pipe or conduit interconnected with the pressure sensor 42 may be smaller than the internal diameter of the pipe 33 for the probe flow 34. In one non-limiting example the internal diameter of the pipe or conduit interconnected with the pressure sensor 42 may be 1 mm, whilst the internal diameter of the pipe 33 providing the probe flow of the second fluid 34 is 5 mm. The internal diameter of the pipe or conduit interconnected with the pressure sensor 42 may be chosen such that the pneumatic speed of response is sufficient to allow the pressure at the pressure sensor 42 to stabilize and produce a steady measurement within each on-off cycle of the probe flow of the second fluid 34. The speed of response may be determined by the length and internal diameter of the pipe or conduit interconnected with the pressure sensor 42 between the aperture 47 and the pressure sensor 42.

The pressure sensor 42 may be located within a cavity or tapping in the body of the outer, first member 24, or alternatively within the intra-seal cavity 22. An electrical connection 43 may be used to transmit measurements from the pressure sensor 42 to control and measurement electronics, such as a controller as previously described.

A temperature sensor 44 may be configured to measure temperature in the intra-seal cavity 22. The temperature sensor 44 may be located within the body of the outer, first member 24, in a cavity or tapping, as illustrated in FIG. 5, or alternatively within the intra-seal cavity 22. An electrical connection 45 may be used to transmit measurements from the temperature sensor 44 to control and measurement electronics, such as a controller as previously described.

The outer, first member 24 may comprise multiple apertures 35 in the sealing surface 25, configured to provide multiple probe flows of the second fluid 34 at an intra-seal cavity 22 or at multiple intra-seal cavities 22 of the rotary seal 20.

The outer, first member 24 may comprise multiple apertures 47 in the sealing surface 25, through which pressure and/or temperature measurements can be made using pressure sensors 42 and/or temperature sensors 44 respectively.

In one example embodiment, multiple apertures 35 in the sealing surface 25 or the outer, first member 24 are provided, and are configured to provide multiple probe flows of the second fluid 34 at the intra-seal cavity 22 equidistantly spaced circumferentially around the intra-seal cavity 22. Further multiple apertures 47 in the sealing surface 25 are provided, and are configured to allow pressure and/or temperature measurements to be made using pressure sensors 42 and/or temperature sensors 44 respectively. These further multiple apertures 47 may be disposed between the multiple apertures 35 for the multiple probe flows 34. In one example embodiment the apertures 47 are equidistant from adjacent apertures 35. In an alternative example embodiment the apertures 47 are in close proximity to an adjacent aperture 35.

In an alternative example embodiment, the apertures 35 in the sealing surface 25 that are configured to provide multiple probe flows of the second fluid 34 may be the same apertures 47 which are configured to allow pressure and/or temperature measurements to be made. Such a configuration is possible when the rate of gas leakage flow 14 from an intra-seal cavity 22 is small compared to the volume of the intra-seal cavity 22, such that the influence of the probe flow 34 lasts longer than the speed of response of the pipe or conduit interconnected with the pressure sensor 42.

The sealing surface 25 of the outer, first member 24 may be formed of an abradable material which may be a soft abradable material. Alternatively a deformable material, such as a honeycomb structure, which may also be an abradable material, can be provided for the sealing surface 25. The material of the sealing surface 25 allows for contact between the sealing surface 25 and the protrusions 28, without causing significant damage to the protrusions 28. The outer, first member 24 and/or the sealing surface 25 may be replaceable.

Although embodiments of the present invention have been described in the preceding paragraphs with reference to various examples, it should be appreciated that modifications to the examples given can be made without departing from the scope of the invention as claimed. For example although the leakage flow has been described in relation to a gas, the apparatus and method could equally be applied to leakage flow in relation to other fluids, such as a liquid.

Although the protrusion 28 on the inner, second member 26 has been described as extending from the body of the inner, second member 26 in a radial direction, it will be apparent that the protrusion may be canted from the radial axis such that the protrusion 28 is inclined into the fluid leakage flow 14.

Although the rotary seal 20 and a system 30 for measuring fluid leakage flow at the rotary seal 20 have been described in relation to a gas turbine engine 110, it will be apparent to the person skilled in the art that the rotary seal 20 and the system 30 for measuring fluid leakage flow at the rotary seal 20 may be applied to other power generation systems such as steam turbines and electrical generators or other systems comprising two parts between which there is relative rotation and for which sealing between the two parts is required. The method may also be applied to any other fluid flow measurements which involve intermediate cavities in the flow path, such as between the multiple sealing rings on a piston of a reciprocating engine.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A method of measuring a flow rate of a first fluid flow, the first fluid flow flowing through a rotary seal of a gas turbine engine, comprising:
    applying a probe flow of a second fluid to an intra-seal cavity;
    controlling the probe flow at the intra-seal cavity; and
    measuring a pressure of the first fluid flow at a location before applying the probe flow, measuring a pressure of the first fluid flow at the location after applying the probe flow, and determining a pressure change based on the measured pressures of the first fluid flow at the location caused by applying the probe flow of the second fluid; and
    determining a flow rate of the first fluid flow from the pressure change in the first fluid flow.

2. A method as claimed in claim 1, comprising measuring, at multiple locations within the rotary seal, the pressure of the first fluid flow before applying the probe flow, measuring the pressure of the first fluid flow after applying the probe flow, and determining the pressure change based on the measured pressures of the first fluid caused by applying the probe flow of the second fluid.

3. A method as claimed in claim 2, wherein some or all of the multiple locations are in the intra-seal cavity.

4. A method as claimed in claim 1, comprising
performing the method during in-service operation of the gas turbine engine.

5. A method as claimed in claim 1, comprising
modulating the probe flow.

6. A method as claimed in claim 1, comprising
measuring the probe flow.

7. A gas turbine engine comprising:
    a first cavity and a second cavity, whereby during operation of the gas turbine engine the first cavity receives a flow of a first fluid at a first pressure and the second cavity receives the first fluid flow at a second pressure, the first pressure being higher than the second pressure;
    a rotary seal separating the first cavity from the second cavity, comprising a first member, a second member radially proximal to the first member, that rotates relative to the first member during operation of the gas turbine engine and at least one intra-seal cavity formed between the first member and the second member;
    a probe flow control system configured to control a probe flow of a second fluid at the at least one intra-seal cavity; and
    a sensor configured to measure a pressure of the first fluid flow at a location before applying the probe flow and measuring a pressure of the first fluid flow at the location after applying the probe flow in order to determine a pressure change based on the measured pressures of the first fluid flow at the location caused by applying the probe flow of the second fluid.

8. A gas turbine engine as claimed in claim 7, wherein the sensor is located in the at least one intra-seal cavity.

9. A gas turbine engine as claimed in claim 7, comprising multiple sensors each configured to measure the pressure of the first fluid flow before applying the probe flow and measure the pressure of the first fluid flow after applying the probe flow in order to determine the pressure change based on the measured pressures of the first fluid caused by applying the probe flow of the second fluid.

10. A gas turbine engine as claimed in claim 7, wherein the probe flow control system is configured to modulate the probe flow.

11. A gas turbine engine as claimed in claim 7, wherein the probe flow control system comprises a meter configured to measure the probe flow.

12. A gas turbine engine as claimed in claim 7, wherein the probe flow control system comprises a regulated store of compressed gas.

13. A rotary seal for a gas turbine engine comprising:
a first member;
a second member;
a sealing surface, the sealing surface configured to form a seal with the second member of the rotary seal that rotates relative to the first member during operation of the gas turbine engine, the second member being radially proximal to the first member, wherein the seal comprises at least one intra-seal cavity formed between the sealing surface and the second member; and
multiple probe flow apertures in the sealing surface configured to provide a probe flow of a second fluid and multiple pressure sensor apertures configured to measure a pressure of a first fluid flow as it flows through the rotary seal at a location at the at least one intra-seal cavity before applying the probe flow and measuring a pressure of the first fluid flow at the location after applying the probe flow in order to determine a pressure change based on the measured pressures of the first fluid flow at the location caused by applying the probe flow of the second fluid.

14. A rotary seal for a gas turbine engine as claimed in claim 13, comprising a pipe extending through the first member defining, at one end, an aperture in the sealing surface and defining, at the other end, an interface for transfer of the probe flow of the second fluid.

15. A rotary seal of a gas turbine engine as claimed in claim 13, comprising a temperature sensor configured to measure temperature in the at least one intra-seal cavity.

16. A rotary seal of a gas turbine engine as claimed in claim 13, wherein each of the multiple probe flow apertures in the sealing surface is configured to provide the probe flow of the second fluid at the at least one intra-seal cavity.

* * * * *